United States Patent [19]
Bonarski

[11] 3,952,507
[45] Apr. 27, 1976

[54] CANISTER REBURN EXHAUST SYSTEMS

[76] Inventor: Henry Bonarski, P.O. Box 1191, Savona, N.Y. 14879

[22] Filed: Mar. 29, 1974

[21] Appl. No.: 456,262

[52] U.S. Cl. .............................. 60/278; 23/277 C; 60/303
[51] Int. Cl.² ..................... F02M 25/06; F01N 3/14
[58] Field of Search ................ 60/278, 279, 303; 23/277 C

[56] References Cited
UNITED STATES PATENTS

| | | | |
|---|---|---|---|
| 3,059,421 | 10/1962 | Schnabel | 60/303 |
| 3,172,251 | 3/1965 | Johnson | 60/278 |
| 3,210,161 | 10/1965 | Soltau | 60/303 |
| 3,211,534 | 10/1965 | Ridgway | 60/288 |
| 3,393,668 | 7/1968 | Milgram | 60/279 |
| 3,601,982 | 8/1971 | McCrocklin | 60/303 |
| 3,773,894 | 11/1973 | Bernstein | 60/301 |
| 3,813,878 | 6/1974 | McKee | 60/303 |

*Primary Examiner*—Douglas Hart
*Attorney, Agent, or Firm*—Dowell and Dowell

[57] ABSTRACT

The canister reburn exhaust system for motor driven automobiles includes a cylindrical casing of greater diameter than the exhaust pipe adapted to form part of the exhaust pipe in advance of the muffler. One or more canister tube units substantially fill the casing intermediate its ends, each unit comprising a pair of spaced end plates peripherally welded to the casing and having perforations extending therethrough into which the ends of canister tubes are welded, whereby the exhaust gases must pass through the canister tubes on their way to the muffler. The end plates of adjacent units are spaced apart to provide an exhaust reburn chamber. Opposed baffle plates are disposed within the chamber spaced from the end plates, each baffle plate covering substantially three-fourths of the chamber area. At least one spark plug is provided in the chamber disposed between the baffle plates adapted to be connected in the ignition. A duct admits air into the casing at the inlet end of each unit; and another duct returns the hot air from the outer end of the chamber to the carburetor.

5 Claims, 4 Drawing Figures

CANISTER REBURN EXHAUST SYSTEMS

DESCRIPTION OF THE INVENTION

This invention relates to auto emissions control systems, and the principal object of the invention is to provide a canister reburn exhaust system for automobiles adapted to be inserted in or to form part of the exhaust pipe of any motor driven automobile in advance of the usual muffler. This inention will do away with all present carburetor auto emissions control devices and will allow the auto industry to return to standard motors on all autos since all unburnt fumes and gases will be taken care of in the reburn chamber of the system.

Another object of the invention is to provide a canister reburn exhaust system comprising a substantially cylindrical casing of circular or oval cross-section having its ends retracted and provided with means to connect one end of the casing with the exhaust pipe of the automobile while the other end may be shaped to engage the muffler of the automobile. The casing is of sufficient length to house therein one or more canister tube units which are spaced apart and spaced from the ends of the casing so as to provide therebetween an exhaust reburn chamber. Positioned within the reburn chamber are a pair of opposed spaced baffle plates each of which cover, respectively, about ¾ of the reburn chamber area, and between the baffle plates spark plugs are mounted in the casing, which spark plugs are electrically connected in the ignition circuit of the engine.

Other objects of the invention are to provide a system as above described, in which the casing is substantially filled with stainless steel or Allegheny tubing spot welded together between end plates, to conform with the cross-sectional shape of the casing through which the exhaust gases must pass on their way to the gas reburn chamber of the casing; also, to provide a reburn chamber which is disposed between adjacent canister tube units, the baffle plates of which are positioned about 1 inch or more from the end plates of the canister tube units; and the reburn chamber to have a seat and tap to take a commercial size spark plug, preferably one on each side of the reburn chamber, which spark plugs are hooked into the auto electrical ignition system, or to the spark plug firing timer of the automobile, the spark plugs being preferably of high voltage type.

A further object of the invention is to provide one or more compact canister tube units for the casing, each unit having end plates which are drilled to receive the ends of the canister tubes forming the unit, which tubes are welded at their ends into the holes extending through the end plates, the end plates then being welded to interior of the casing, so that there can be no leakage around the end plates and therefore the gases or fumes must pass through the tubes and proceed to the reburn chamber.

A further object of the invention is to provide taps for an air line at one end of each of the canister tube units, also to provide similar taps in the reburn chamber for hot air return at the opposite end of the canister tube units adjacent the baffle plates, for returning gases or fumes and the like to the carburetor of the automobile.

I will explain the invention with reference to the accompanying drawing, which illustrates several practical embodiments thereof, to enable others familiar with the art to adopt and use the same; and I will summarize in the claims the novel features of construction, and novel combinations of parts, for which protection is desired.

IN THE DRAWINGS

Figure 1:
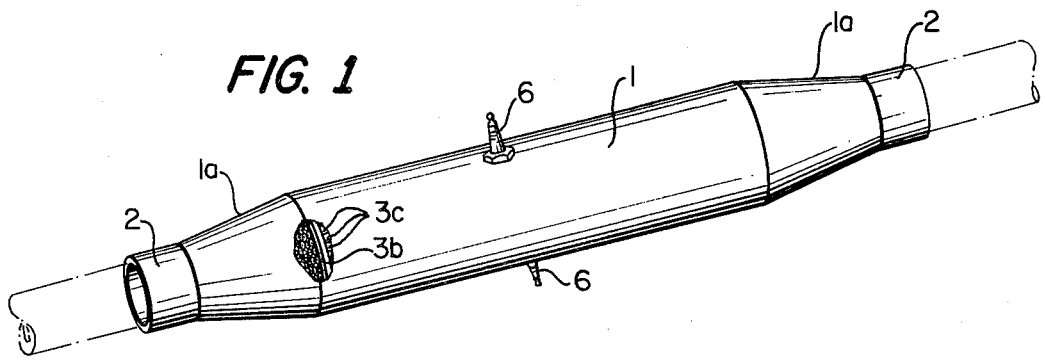
FIG. 1 is a perspective view of my novel system connected in the exhaust pipe of an automobile in advance of the usual muffler.
Figure 2:
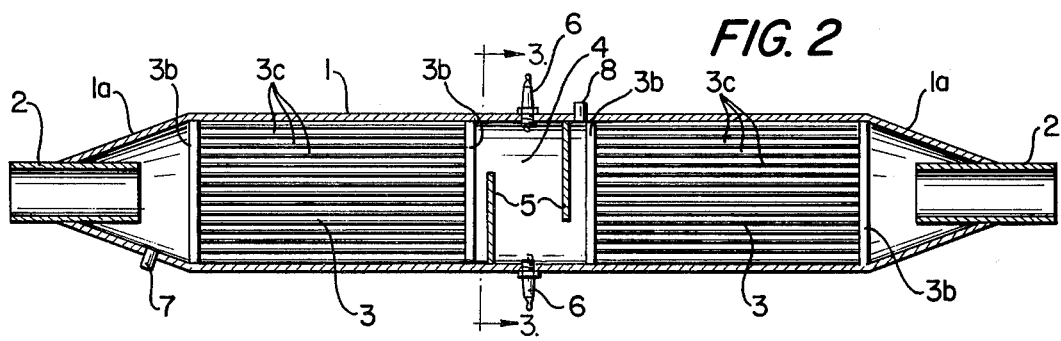
FIG. 2 is an enlarged longitudinal section through the casing shown in FIG. 1.
Figure 3:
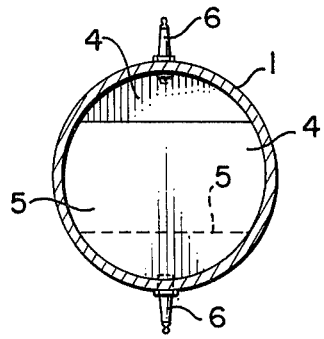
FIG. 3 is an enlarged transverse section on the line 3–3, FIG. 2.

As shown in FIGS. 1–3, my novel canister reburn exhaust system comprises a substantially cylindrical casing 1, of either circular or oval cross-section, and preferably formed of stainless steel, having its ends contracted, as at 1a, to receive the sleeves 2 which may be the ends of a break substantially the exhaust pipe of the main body portion of the casing 1, but terminating short of one contracted or 1 like in advance of the usual muffler, or the described. 2 may if desired be glanged to engage mating flanges on the exhaust pipe and muffler of the automobile, number perforations engage perforations.

Figure 4:
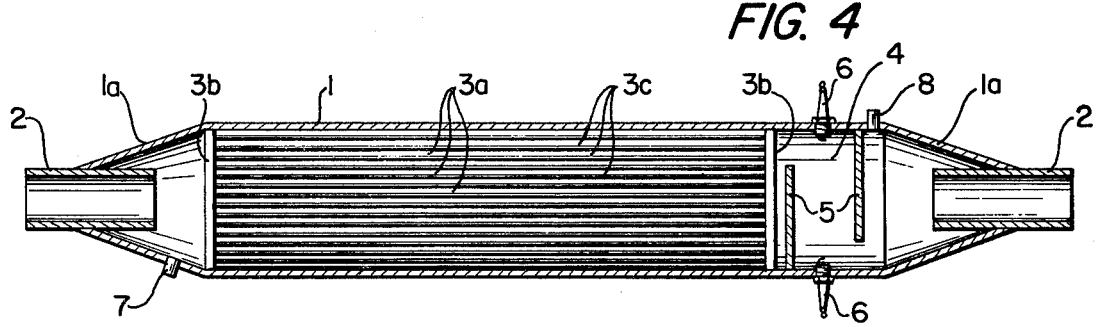
FIG. 4 is a longitudinal section, similar to FIG. 2, but showing a modification of the canister tube unit arrangement in the casing.

Within the casing 1 are disposed spaced canister tube units 3, two such units being shown in FIG. 2, coextensive with the length of the main body portion of the casing 1. However, if desired, only one such unit 3a may be used, as shown in FIG. 4, same extending substanially the full length of one conracted end 1a of the casing, for the purpose hereinafter dexcribed. Each unit 3 comprises a pair of spaced end plates 3b preferably of stainless steel or the like which are provided with a large numer of perforations extending therethrough for receiving a large number of canister tubes 3c of the units whose ends engae in said performations of the end plates 3b and are welded in place therein in a gas-tight manner. Similarly, the periphery of each end plate 3b is also welded to the interior of the casing 1 so that all gases or fumes passing through the casing 1 must pass through the canister tube units 3. Preferably, the tubes 3c are formed of stainless steel or Allegheny steel tubing of a size of about ⅛ inch to ⅜ inch in diameter, but are of length about 6 inches in FIG. 2, but may be considerably longer when only one unit is used, as in FIG. 4.

In FIG. 2, the inner ends of the units 3 are spaced apart sufficiently to form an exhaust reburn chamber 4 of substantial width, and within chamber 4 are spaced opposed baffle plates 5 each spaced about 1 inch from its adjacent end plate 3b of its related unit 3 said baffle plates 5 covering respectively about three-fourths of the reburn chamber area so as to form a tortuous path for the gases or fumes passing through the reburn chamber 4 on their way to the muffler of the automobile.

In the exhaust reburn chamber 4 between baffle plates 5, one or more high voltage-type spark plugs 6 are mounted in tapped seats formed in the wall of the casing 1. In the drawings, two such plugs 6 are shown which are disposed in diametrically opposed relation in each reburn chamber 4. The spark plugs 6 are connected by suitable wiring into the electrical ignition system of the automobile, or are connected to the spark plug firing timer of the automobile, so as to ignite any unburned combustibile gases or fumes which may reach the reburn chamber 4 through the canister tube units 3 before same pass to the muffler of the automobile.

To assist the said reburning of said gases or fumes, I provide at the inlet end of the canister tube unit 3 an air line seat and tap 7; also an air line seat and tap 8 for returning the hot air at the outer end of the reburn chamber 4 to the carburetor of the automobile.

The tube units 3 serve several useful purposes. The tubes are themselves heated to a high temperature by the exhaust gases which must pass through the tubes with reduced velocity since the end plates in which the tubes are fixed will block passage of exhaust between the tubes. Since air is also introduced through the duct 7 into the tubes, in the course of passing through the tubes the exhaust gases and the air are thoroughly mixed and maintained in intimate mutual contact for a considerable period of time. Moreover, since the internal surfaces of the tubes are hot, these surfaces tend to provide catalytic action to promote oxidation of unburned components of the exhaust gas.

My invention will do away with all present carburetor auto emissions control devices and will allow the auto industry to return to the standard motor in all automobiles, since all unburned gases and fumes from the motor will be eliminated in the reburn chamber 4 of my canister reburn exhaust system.

I claim:

1. An axial flow reburn canister system for an internal combustion engine having an electrical ignition system and a carburetor and having an exhaust pipe leading to a muffler, comprising a cylindrical casing of greater diameter than the exhaust pipe and having axially disposed inlet and outlet end portions shaped to couple into the exhaust pipe in advance of the muffler; at least one canister tube unit tranversely filling said casing and approaching its ends, said unit comprising a pair of spaced end plates peripherally welded to the casing and having perforations extending therethrough receiving the ends of canister tubes which are welded therein, whereby the exhaust gases must pass through the canister tubes on their way to the muffler; the casing having an axial space located downstream of one of the end plates to provide an exhaust reburn chamber; axially-spaced transversely disposed baffle plates within the chamber spaced downstream of said one end plate, each baffle plate covering substantially three-fourths of the cross-sectional chamber area and being shaped to provide a zig-zag path through the chamber; at least one spark plug in said chamber disposed between the baffle plates and connected in the ignition system; means for admitting air into the casing at the inlet end portion of the casing; and means for returning burnt gases from the downstream end of the chamber to the carburetor.

2. In a system as set forth in claim 1, said casing, end plates, baffle plates and tubes being formed of stainless steel.

3. In a system as set forth in claim 1, said canister tube unit substantially filling the casing upstream of said chamber and having an inlet end plate adjacent said means for admitting air and an outlet end plate located adjacent to said chamber.

4. In a system as set forth in claim 1, two spark plugs being mounted in diametrically opposed tapped seats in the wall of the reburn chamber, said plugs having electrodes, insulated from the casing and adapted to ignite any unburned gases or fumes in the reburn chamber before passing into the muffler.

5. In a system as set forth in claim 1, a second canister tube unit in said casing and having an upstream end plate spaced from said one of said first-mentioned end plates to define the reburn chamber, the first-mentioned tube unit having an inlet end plate adjacent said means for admitting air, and the second tube unit having an outlet end plate adjacent the outlet end portion of the casing.

* * * * *